(12) United States Patent
Wright et al.

(10) Patent No.: US 6,600,107 B1
(45) Date of Patent: Jul. 29, 2003

(54) CABLE GUIDING

(75) Inventors: Colin Morgan Wright, Somerset (GB); Barry Barlow, Somerset (GB)

(73) Assignee: Cooper B-Line Limited, Somerset (GB)

( * ) Notice: Subject to any disclaimer, the term of this patent is extended or adjusted under 35 U.S.C. 154(b) by 0 days.

(21) Appl. No.: 10/019,060

(22) PCT Filed: Jun. 28, 2000

(86) PCT No.: PCT/GB00/02484

§ 371 (c)(1),
(2), (4) Date: Mar. 13, 2002

(87) PCT Pub. No.: WO01/01534

PCT Pub. Date: Jan. 4, 2001

(30) Foreign Application Priority Data

Jun. 28, 1999 (GB) .............................................. 9915041
Nov. 9, 1999 (GB) .............................................. 9926536

(51) Int. Cl.[7] ................................................. H02G 3/00
(52) U.S. Cl. ................. 174/72 A; 174/101; 174/138 D; 174/68 C; 174/72 C; 174/164; 174/166 S; 361/826; 361/827; 361/641; 361/659

(58) Field of Search ............................... 174/72 A, 101, 174/138 D, 68 C, 72 C, 164, 166 S; 361/826, 827, 641, 659

(56) References Cited

U.S. PATENT DOCUMENTS

| | | | | |
|---|---|---|---|---|
| 3,906,146 A | * | 9/1975 | Taylor | 174/101 |
| 3,910,536 A | * | 10/1975 | Sharp et al. | 174/138 D |
| 5,448,015 A | * | 9/1995 | Jamet et al. | 174/101 |
| 5,715,145 A | * | 2/1998 | Wong et al. | 361/756 |
| 5,731,546 A | * | 3/1998 | Miles et al. | 174/135 |
| 5,745,337 A | | 4/1998 | Reiner | |

* cited by examiner

Primary Examiner—Dean A. Reichard
Assistant Examiner—Anton Harris
(74) Attorney, Agent, or Firm—Burns, Doane, Swecker & Mathis, L.L.P.

(57) ABSTRACT

A rack suitable for housing connections of cables in a telecommunications or data communications network includes a plurality of cable guides (2) and a plurality of cable guide mountings (3) at each of which the cable guides are capable of being mounted. The cable guides (2) are detachably mountable and are able to be detached and attached without the use of tools. A cable retaining portion (14) is provided at the free end of a cable guide.

23 Claims, 6 Drawing Sheets

CABLE GUIDING

The invention relates to cable guiding on a rack suitable for housing connections of cables in a telecommunications or data communications network. The invention more particularly relates to a rack including cable guides, to a cable guide for use on such a rack, to a flat pack for assembling on site into such a rack and to a method of making cable connections in such a rack. The rack may be clad with panels and thus take the form of what is referred to herein as an enclosure, but it may also be used without such panels.

Racks commonly have many cables passing in and out of them and it is desirable to maintain those cables in an orderly manner and to guide them along suitable paths. For that purpose it is already known to provide cable guides of various kinds on a rack. Such cable guides may also serve the purpose of enabling the length of a particular cable path to be adjusted to accommodate a particular length of cable; such an arrangement may for example be useful when connections are to be made between two racks placed side-by-side.

Desirably, a cable guidance system is simple and inexpensive but also effective and able to adapt to a wide variety of different conditions which may arise during use. Hitherto it has proved difficult to provide a rack that includes a cable guidance system that provides even the majority of the desirable features just referred to and the present invention seeks to overcome or mitigate that problem.

The present invention provides in a first aspect a rack suitable for housing connections of cables in a telecommunications or data communications network, the rack including a plurality of cable guides and a plurality of cable guide mountings at each of which the cable guides are capable of being mounted, wherein the cable guides are arranged to be detachably mountable at the plurality of cable guide mountings and are able to be detached and attached without the use of tools.

The present invention further provides in the first aspect a rack suitable for housing connections of cables in a telecommunications or data communications network, the rack including a plurality of cable guides and a plurality of cable guide mountings at each of which the cable guides are capable of being fixed, wherein the cable guides are arranged to be detachably mountable at the plurality of cable guide mountings and are able to be detached and attached by rotation of the cable guide.

By providing a rack with cable guides that can readily be detached and attached, it immediately becomes easy to adjust the cable guiding system to different configurations for different purposes. If the cable guides are able to be detached and attached without having to rely upon tools, that further facilitates the alteration of the cable guiding system.

Preferably each cable guide includes a mounting portion for engagement with a respective cable guide mounting and a guiding portion providing one or more guide surfaces for a cable. The mounting system for mounting the cable guides may take various forms but it is especially preferred that the mounting portion includes a mounting head connected to the cable guide by a neck and the cable guide mountings are defined by holes in one or more generally lamellar parts of the rack, the head being insertable in a first orientation of the cable guide through a selected one of the holes defining the cable guide mountings and then rotatable to a second orientation in which the head is unable to pass back through the selected hole. With such a system it is a very simple operation, without any tools, to attach a cable guide to a mounting on the rack or to detach it from such a mounting.

Preferably rotation of the cable guide in use serves to secure the guide to a lamellar part around the hole through which the guide is inserted; if desired the rotation can cause a progressively increasing clamping action. In that way, simple rotation of the cable guide by hand can lead to a secure fixing of the guide on the rack.

Preferably, the cable guiding portion of each cable guide is generally in the form of a rod; preferably the rod is of substantially circular cross-section.

It is an especially advantageous feature of the invention that each guide preferably includes a cable retaining portion at the opposite end of the guiding portion to the mounting portion. The cable retaining portion advantageously projects laterally outwards and may take various forms: for example, it may be defined by a flange; the flange may be circular and may extend around the whole of the cable guiding portion at a substantially constant width. Alternatively and advantageously the width of the flange may vary around the cable guide and may not exist in some regions. Thus the cable retaining portion may project laterally outwardly from the guiding portion substantially further in one or more directions than in other directions.

The cable retaining portion may be fixed to the cable guiding portion and may be formed integrally therewith. According to an especially preferred feature of the invention, however, the cable retaining portion is adjustably mounted on the cable guiding portion; preferably it is rotatably mounted on the cable guiding portion. Preferably the cable retaining portion is arranged to be mounted on the cable guiding portion by fitting it over a free end of the cable guiding portion. The cable retaining portion may be continuously and infinitely adjustable around the cable guiding portion but it is preferred that it is adjustable between a plurality of predetermined different positions relative to the cable guiding portion. By providing the adjustment facility referred to above it becomes possible to arrange for the cable retaining portion to present little or no obstruction to the initial placing of a cable around the guide but thereafter, following adjustment of the retaining portion, to obstruct removal of the cable and thereby retain the cable in its desired location.

The spacing of the cable guides and the amount of the lateral projection of the cable retaining portion may be chosen to be such that when the projections are adjusted to a position in which they are directed towards one another, the space between them is so small that a cable is unable to pass between them; indeed the projections may touch one another.

In addition to the cable retaining portion, a guide may further include one or more cable dividers projecting radially from the guiding portion of the guide. The cable dividers may be in the form of discs. Generally it is preferred that the discs are circular and extend around the whole of the cable guiding portion at a substantially constant width, but it is also possible for the lateral projection to be greater in some directions than in others.

The cable dividers may be a friction fit on the cable guiding portion of the guide.

The cable dividers may have any appropriate features of the cable retaining portion described above.

Parts of the cable guides may be apertured to facilitate the connection of cable ties between adjacent parts of the same cable guide or parts of adjacent cable guides.

The cable guide mountings may be fixed to one or more of the frame members of the rack and they may also be fixed to one or more other members mounted on the frame members. Such other members may extend vertically, horizontally across all or part of the frame between one side and the other or horizontally through all or part of the depth of the frame between the back and the front; usually the cable guide mountings are provided on a vertical face of a member, but they may also be provided on a horizontal face. Thus there is considerable flexibility regarding the locations of the cable guide mountings. Preferably at least some of the cable guide mountings are arranged in one or more rows, more preferably in one or more horizontal rows and/or one or more vertical rows.

The rack may further include cables which are connected to terminals in the enclosure, the paths of one or more of the cables being guided by one or more of the plurality of cable guides which are mounted on at least some of the cable guide mountings.

The cable retaining feature of the cable guide has been described above only in combination with the feature of detachability of the guide but can also be employed without that feature. Thus the invention further provides in a second aspect, a rack suitable for housing connections of cables in a telecommunications or data communications network, the rack including a plurality of cable guides, each guide including a generally rod-shaped guiding portion extending outwardly from a mounted end to a free end, and a cable retaining portion at the free end of the rod-shaped guiding portion, the cable retaining portion extending laterally beyond the guiding portion in one or more radial directions and being rotatable to adjust the direction of said one or more radial directions.

The rack according to the second aspect of the invention may further comprise any of the features of the rack according to the first aspect of the invention.

The term "enclosure" used above should not be taken to imply that there are continuous walls defining a fully closed space. Often it is desirable for there to be panels enclosing a substantial part of the enclosure in order both for the connections to be protected and for persons to be protected from the connections. It should be understood, however, that it is within the scope of the present invention to provide an enclosure with only some panels or a rack without any panels.

The present invention further provides a flat pack comprising a plurality of parts for assembly on site into a rack as defined above.

The invention still further provides a method of making cable connections in a rack as defined above, including the step of guiding a cable around one or more of the plurality of cable guides. In the case where the cable retaining portion is adjustable, the cable is preferably placed around a cable guide and thereafter the guide is adjusted to cause a part of the cable retaining portion to overlie part of the cable.

By way of example, embodiments of the invention will now be described with reference to the accompanying drawings, of which.

Figure 1:
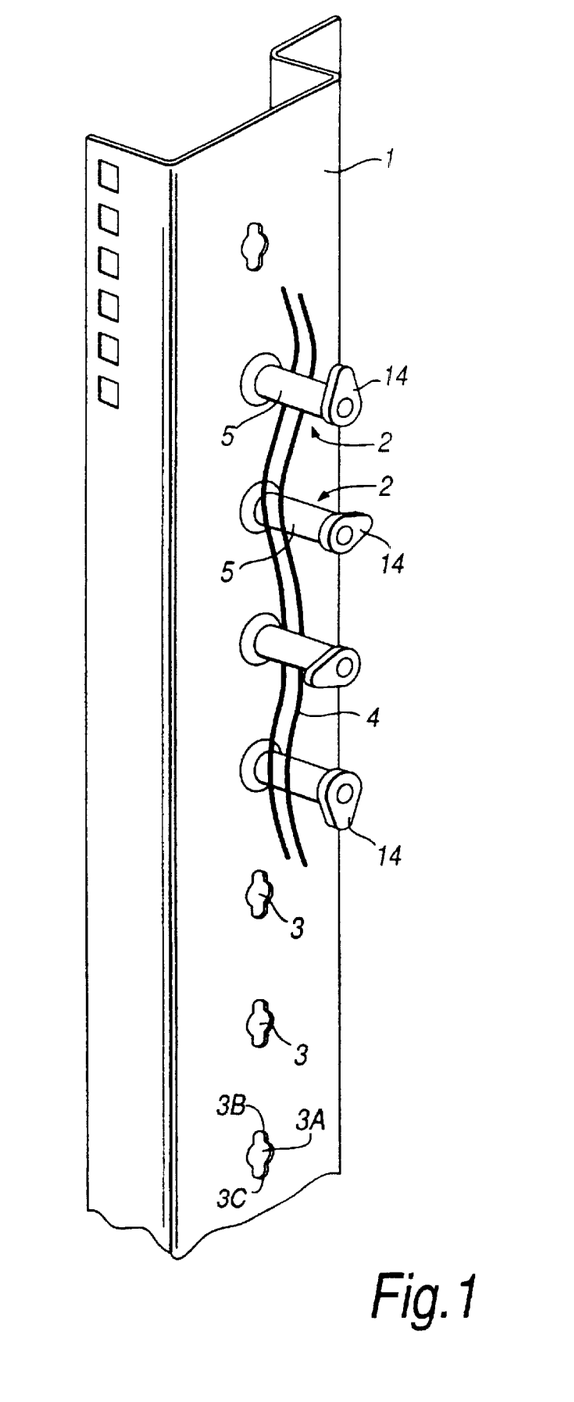
FIG. 1 is a perspective view of a vertical frame member of a rack with a plurality of cable guides mounted thereon.

Referring first to FIG. 1, there is shown a vertical frame member 1 that is mounted on a rack (not shown) for use in a telecommunications or data communications network. As will be understood the vertical frame member may be mounted in a variety of locations on the rack; a common location would be a side of the rack. The frame member 1 is shown carrying a plurality of cable guides 2 mounted in selected ones of a row of holes 3 extending along the length of the member. The frame member may exist for the sole purpose of mounting the guides 2 or may serve other purposes as well. In FIG. 1, part of a cable 4 is shown guided along a tortuous path by the guides 2.

Figure 4:
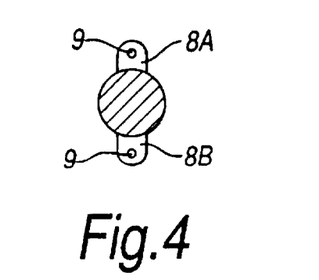
FIG. 4 is a sectional view along the lines BB of FIG. 2.
Figure 5:
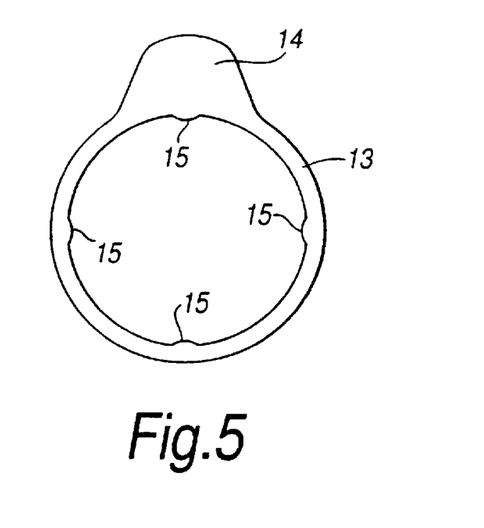
FIG. 5 is an end view of a cable retaining part for fitting to the main part of the guide shown in FIGS. 2 to 4.
Figure 6:
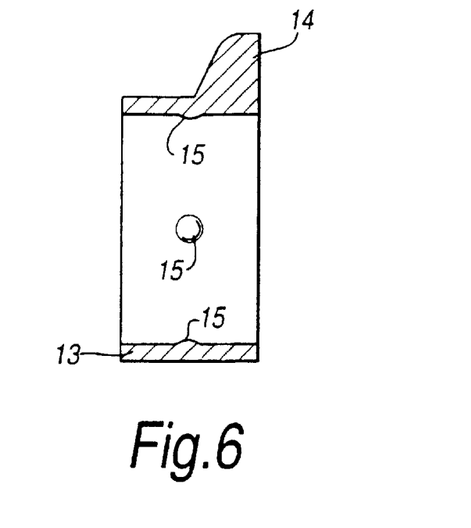
FIG. 6 is a side view of the cable retaining part of FIG. 5.

Each guide 2 comprises a main part (shown in FIGS. 2 to 4) and a cable retaining part (shown in FIGS. 5 and 6).

Figure 2:
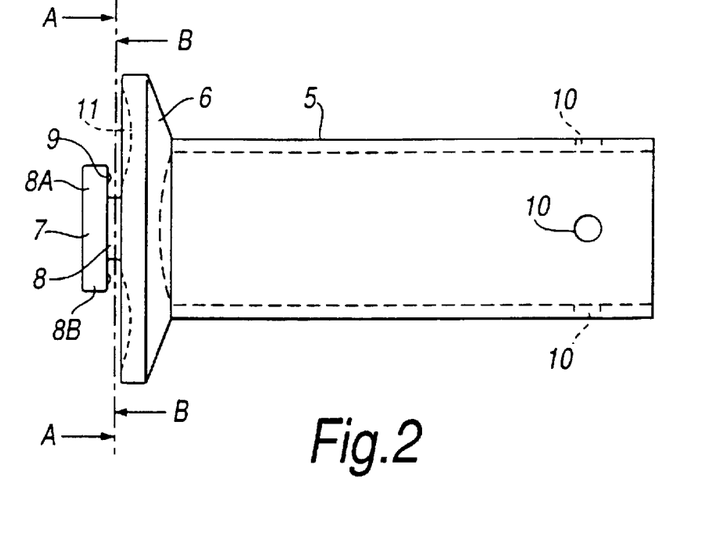
FIG. 2 is a side view of a main part of one of the guides.
Figure 3:
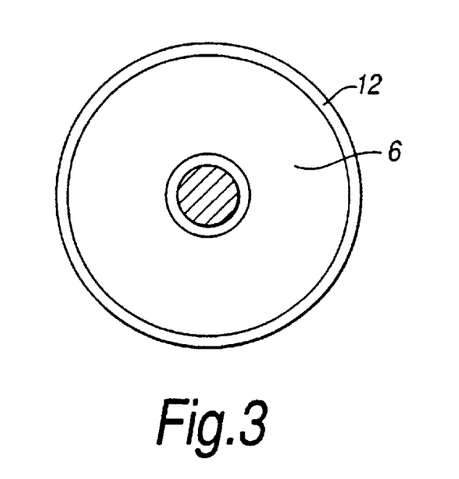
FIG. 3 is a sectional view along the lines AA of FIG. 2.

Referring first to FIGS. 2 to 4, the main part generally comprises a rod portion 5 of circular cross-section, a base 6 and a mounting head 7 connected via a neck 8 to the opposite face of the base portion to that from which the rod portion 5 extends. The rod portion 5 is hollow and is defined by a circular wall 9. Four holes 10 are provided towards the distal end of the rod around a circumference of the wall 9 at intervals of 90°.

The base 6 is formed with a slight recess 11 around the neck 8. The recess 11 extends out towards the periphery of the base portion but terminates short of the periphery such that the rearmost part of the base 6 is defined by a peripheral ring portion 12. The neck 8 is of circular cross-section and extends rearwardly from the centre of the base portion to a mounting head 7 including two laterally projecting lugs 8A, 8B provided, in regions facing the base 6, with dimples 9.

The cable retaining part has a generally cylindrical body 13 sized to fit snugly over the rod portion 5 and a projecting lug 14 which projects radially outwardly from the body 13 in one circumferential region of the body. Four dimples 15 are provided around an internal circumference of the cylindrical body 13 at intervals of 90°.

In use, the cylindrical body 13 can be placed snugly over the rod portion 5 with the rod portion 5 and body 13 in the orientations shown in FIGS. 2 and 6. The dimples 15 bear against the cylindrical body 13 and are accommodated only by virtue of the resilience of both parts but once the dimples 15 become aligned with the holes 10 in the rod portion 5 they enter the holes and the cable retaining part is thereby held on the rod portion 5. If desired the cable retaining part can be rotated relative to the rod portion 5; in that case the dimples 15 are first forced out of the holes 10 and, then, after rotation through 90°, each enter different respective holes. Thus any of four angular orientations of the cable retaining part can be chosen.

The main body of the cable guide, with or without the cable retaining part attached, can readily be secured in one of the holes 3 of the frame member 1 as will now be described. Each hole 3 is of similar elongate shape, but larger than, the mounting head 7 with lugs 8A, 8B. Thus, each hole 3 has a central circular part 3A of diameter suitable for freely and snugly receiving the neck 8 and two diametrically opposite extensions 3B, 3C through which the lugs 8A, 8B can pass. To secure the cable guide in one of the holes 3, a user presents the guide to the hole with the lugs 8A, 8B aligned with respective ones of the hole extensions 3B, 3C, inserts the mounting head 7 through the hole and then rotates the cable guide through 90° relative to the frame member 1. The spacing between the parallel planes containing the dimples 9 on the lugs 8A, 8B and the ring portion 12 of the base 6 is very similar to but slightly less than the thickness of the part of the frame member 1 surrounding the hole 3. Consequently, as the cable guide is rotated through 90° relative to the frame member 1, the lugs 8A, 8B pass behind the part of the frame member surrounding the hole, and that part becomes sandwiched between the dimples 9 and the ring portion 12, thereby securely mounting the cable guide on the frame member.

As will be understood, the cable guide can be removed from the frame member by reversing the operation just described.

With the main body of the cable guide secured to the frame member 1 and the cable retaining part attached, the projecting lug 14 may be arranged to project in any of four radial directions at the choice of a user. In FIG. 1, the two middle cable guides of the four that are shown have lugs 14 projecting laterally whereas the cable guides at the ends have vertically oriented lugs 14. It will be understood that the orientations of the lugs 14 can be changed after the cable guides are fitted to the frame member, for example in order to facilitate initial placing of the cable and/or to enhance the retaining effect of the lugs 14.

In a particular example of the invention the main body of the cable guide and the cable retaining part are made of a polyamide material, more particularly nylon 6. In that example, the rod portion has a diameter of about 35 mm and projects a total distance of about 100 mm from a frame member 1 on which it is mounted.

Whilst one particular cable guiding arrangement has been described, it should be understood that many modifications can be made to that arrangement and some of those will now be mentioned as examples.

Whilst FIG. 1 shows one frame member having a single vertical row of cable guide mountings it may be desirable to provide more than one row of mountings on a single frame member or a plurality of frame members and/or to provide one or more horizontal rows of cable guide mountings. Of course the mountings do not have to be provided in strict rows and other arrays of mountings may be desirable.

The number of different orientations available for the lug 14 of each cable retaining part may easily be varied by altering the number of holes 10 in the rod portion 5; indeed the holes 10 may be replaced or supplemented by a circumferential groove on the rod portion 5 to allow infinitely variable adjustment of the cable retaining part.

If desired the sizes of the lugs 14 and spacing of adjacent cable guides may be arranged such that when the lugs 14 of adjacent guides are adjusted towards one another they make contact or are separated by less than the width of a typical cable, so that such a cable cannot pass the lugs 14 unless they are displaced.

Figure 7:
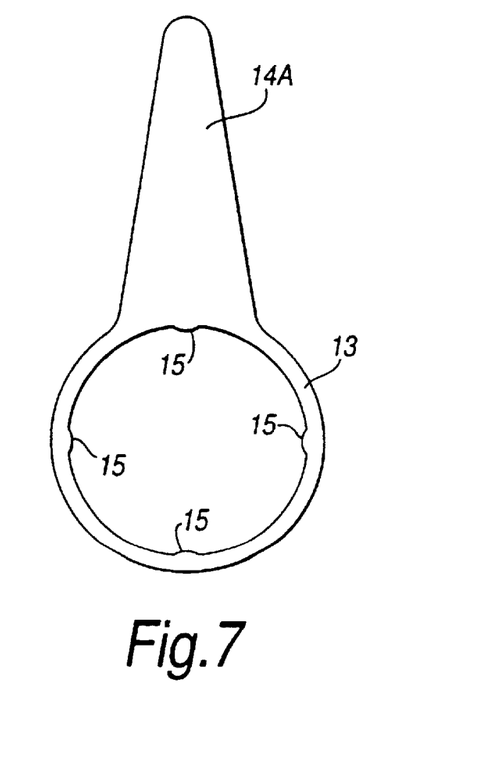
FIG. 7 is an end view of a modified form of the cable retaining part of FIGS. 5 and 6.
Figure 8:
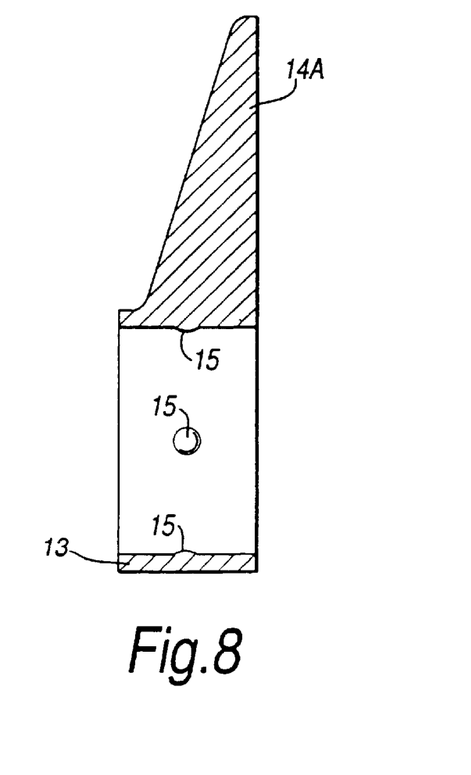
FIG. 8 is a side view of the cable retaining part of FIG. 7.

The lugs 14 may be longer than shown in FIGS. 5 and 6. For example, FIGS. 7 and 8 show a cable retaining part that is substantially the same as that shown in FIGS. 5 and 6 but that includes a lug 14A which projects much further than the lug 14; in other aspects the part of FIGS. 7 and 8 is the same as the part of FIGS. 5 and 6 and corresponding portions are designated by the same reference numerals.

Figure 9:
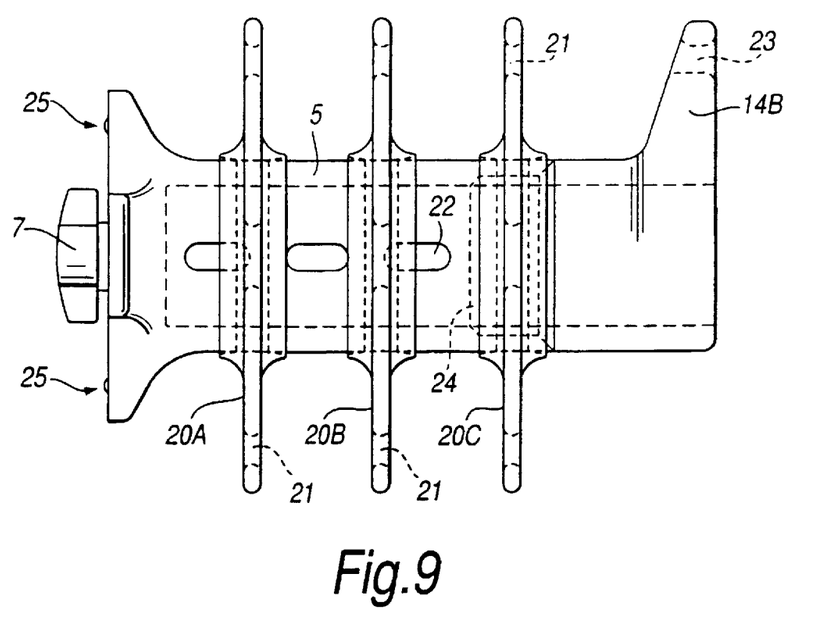
FIG. 9 is a side view of a modified form of guide with its parts assembled.
Figure 10:
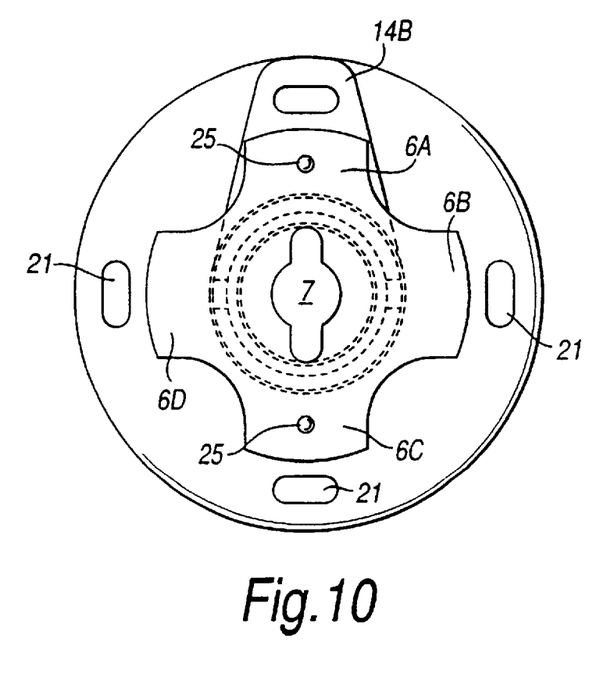
FIG. 10 is an end view (from the left hand end as seen in FIG. 9) of the guide shown in FIG. 9.

FIGS. 9 and 10 show a modified guide. The guide is generally similar to the guide of FIGS. 1 to 6, when modified according to FIGS. 7 and 8, but it will be seen that there are some differences, the more important of which will be described below using the same reference numerals as before to describe corresponding parts.

The guide shown in FIGS. 9 and 10 includes three cable dividers in the form of guide discs 20A, 20B and 20C which are each the same and are mounted on the rod portion 5 of the main part of the guide. Each disc 20A, 202, 20C is of substantially circular outline and has a radial extent substantially the same as the lug 14B. The discs are a friction fit over the rod portion 5 (when the cable retaining part with lug 14B has not yet been fitted) and can be adjusted axially along the rod. In use, the guide discs enable different cables or different groups of cables to be kept separate from one another. In the example shown the guide discs have diameters matched to the radial extent of the lug 14B and thus it can be arranged that if two guides are placed in holes spaced apart by about the diameter of the discs 20A, 20B and 20C, the discs of adjacent guides meet one another thereby trapping the cables in channels formed by the guides and lugs 14B.

The discs 20A, 20B and 20C are also each formed with four equiangularly spaced apertures 21. If desired, cable ties may be secured through apertures 21 in adjacent discs after a cable has been placed between the discs, to provide even greater security for cables.

In the guide shown in FIGS. 9 and 10 apertures 22 are also formed in the outer wall of the hollow rod portion 5 and an aperture 23 is formed in the radially distal end of the lug 14B such that it can be aligned with selected ones of the apertures 21. All the apertures may also serve as location points for cable ties.

It should also be noted that, whereas the cable retaining part of the cable guide of FIGS. 1 to 6 fits over the rod portion 5, in the construction of FIGS. 9 and 10 the cable retaining part has a male end portion 24 which is a friction fit inside a female end portion (over which the disc 20C is shown in FIG. 9) of the rod portion 5. Also, it may be noted that the base is composed of four equiangularly spaced portions 6A, 6B, 6C and 6D and dimples 25 are formed, projecting towards the mounting head 7, on the portions 6A and 6C.

Figure 11:
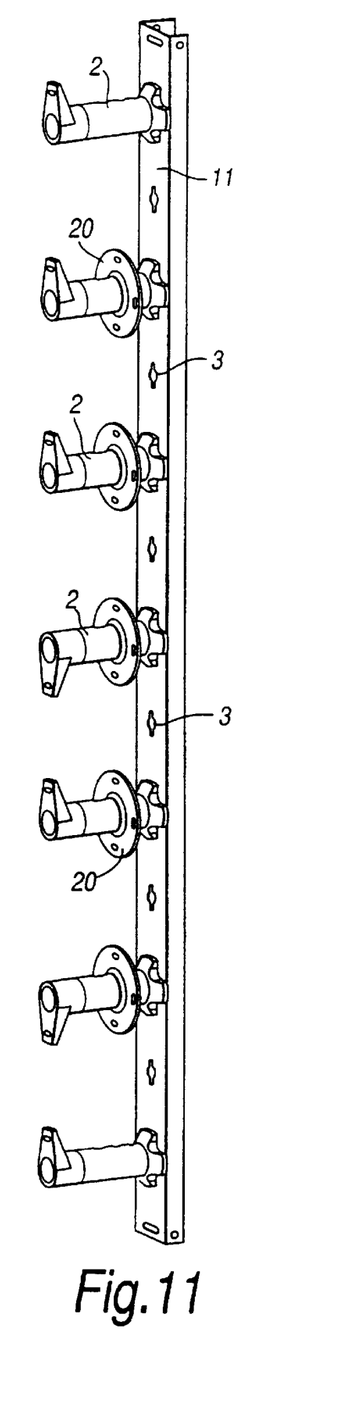
FIG. 11 is a perspective view of a vertical frame member of a rack with a plurality of cable guides according to FIGS. 9 and 10 mounted thereon.

FIG. 11 shows a vertical frame member, similar to the member shown in FIG. 1, with cable guides as shown in FIGS. 9 and 10 mounted thereon. In FIG. 11 parts similar to those of FIG. 1 are designated by the same reference numerals. The frame member 1 of FIG. 11 is shown mounting a plurality of cable guides 2 in alternate mounting holes 3 of the frame member 1. Each of the intermediate guides 2 is shown carrying a single disc 20 which, because alternate holes 3 are not used, are in this case spaced apart from one another. The end guides are not provided with any discs.

It will be appreciated that various modifications are illustrated in FIGS. 9 to 11 and that selected ones of them, or only one of them, may be incorporated in a design of cable guide or rack with cable guides.

Figure 12A:
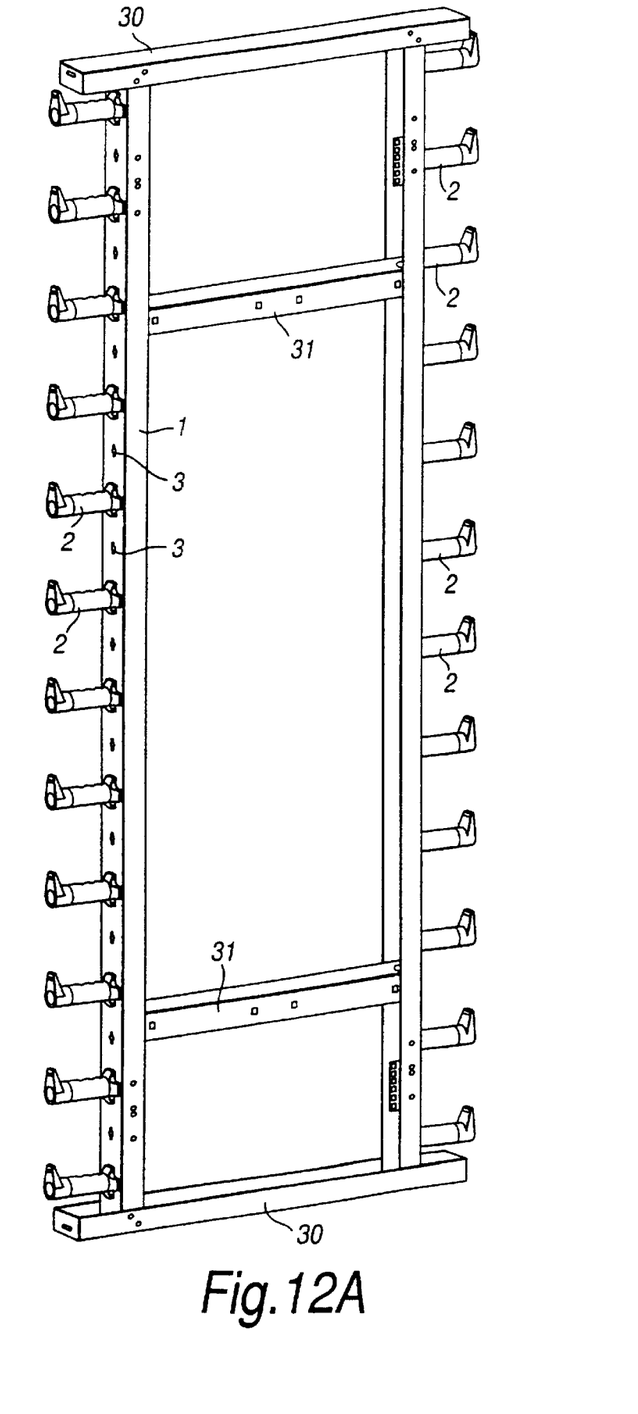
FIG. 12A is a perspective view of a frame assembly including a pair of vertical frame members of the kind shown in FIG. 11; and, FIG. 12B is a perspective view of a rack receiving a frame assembly as shown in FIG. 12A.
Figure 12B:
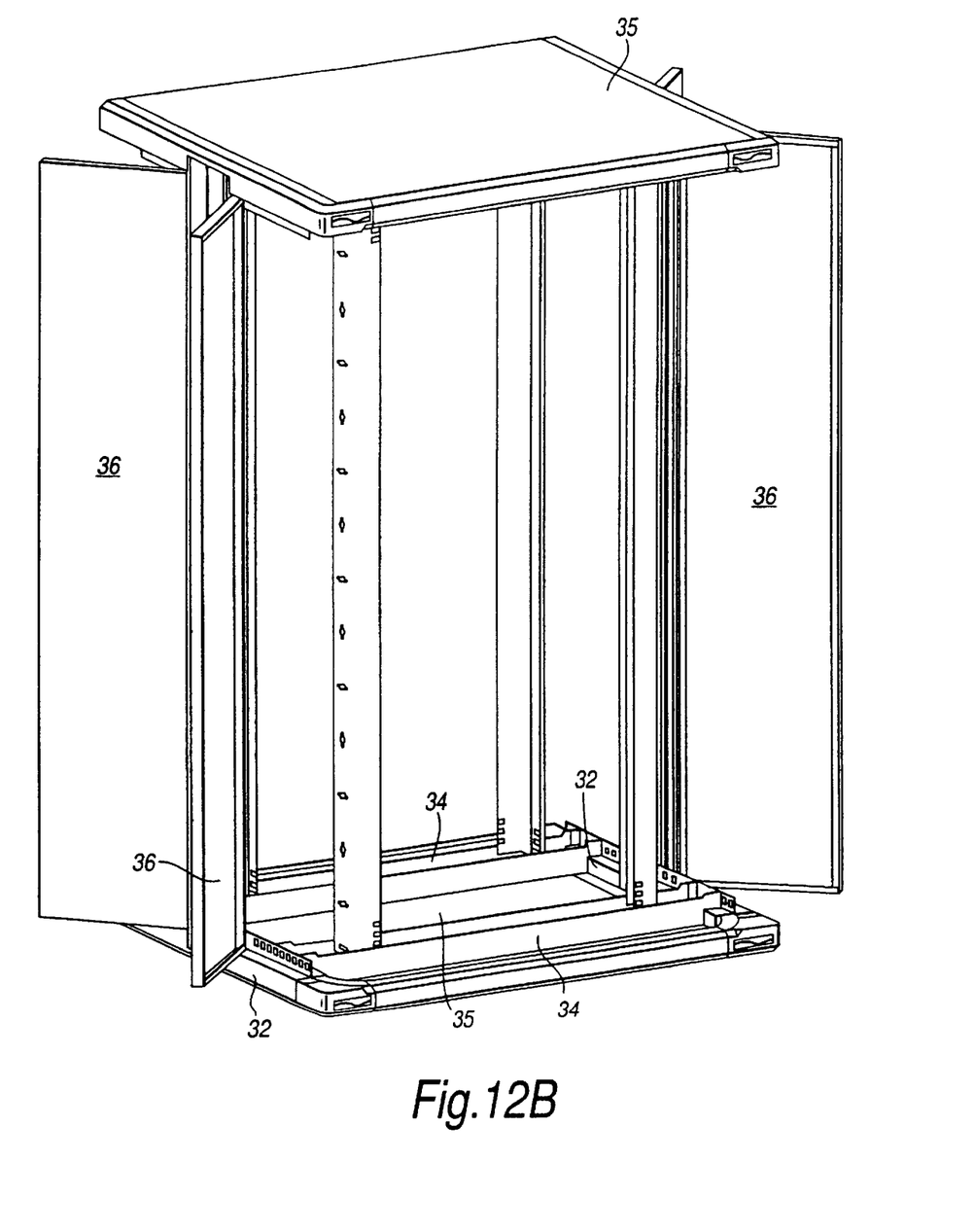

FIGS. 12A and 12B illustrate one example of how frame members may be mounted in a rack. In this particular example, the frame member and cable guides are as shown in FIGS. 9 to 11 (but with the discs 20 omitted), but it will be appreciated that a substantially identical mounting arrangement may also be employed for the other embodiments. FIG. 12A shows a frame assembly comprising two vertical frame members 1 interconnected by top and bottom cross-members 30 and intermediate cross-members 31. FIG.

12B shows a rack that is more fully described in WO99/48305 the description of which is incorporated herein by reference. The rack has top and bottom generally rectangular frames around the periphery of the rack, the rectangular frames including side portions 32 to which the top and bottom cross-members 30 can be attached in the same manner as the bottom transverse frame members 34 shown in FIG. 12B (and their corresponding top transverse members which are not visible in FIG. 12B). The rack shown in FIG. 12B also has top and bottom panels 35 and side panels 36, and may also be fitted with front and rear doors (not shown).

What is claimed is:

1. A rack suitable for housing connections of cables in a telecommunications or data communications network, the rack including a plurality of cable guides and a plurality of cable guide mountings at each of which the cable guides are capable of being mounted, wherein the cable guides are arranged to be detachably mountable at the plurality of cable guide mountings, are able to be detached and attached without the use of tools, and each of the cable guides includes a mounting portion for engagement with a respective cable guide mounting, a guiding portion providing one or more guide surfaces for a cable, and a cable retaining portion at the opposite end of the guiding portion to the mounting portion, the cable retaining portion projecting laterally outwardly from the guiding portion substantially further in one or more directions than in other directions and including a cylindrical part that is fitted over or into the end of the guiding portion and is rotatably mounted on the guiding portion.

2. A rack according to claim 1, in which the mounting portion includes a mounting head connected to the cable guide by a neck and the cable guide mountings are defined by holes in one or more generally lamellar parts of the rack, the head being insertable in a first orientation of the cable guide through a selected one of the holes defining the cable guide mountings and then rotatable to a second orientation in which the head is unable to pass back through the selected hole.

3. A rack according to claim 2, in which rotation of the cable guide in use serves to secure the guide to a lamellar part around the hole through which the guide is inserted.

4. A rack according to claim 1, in which the cable guiding portion of each cable guide is generally in the form of a rod.

5. A rack according to claim 1, in which the cable retaining portion is defined by a flange.

6. A rack according to claim 1, in which the cable retaining portion is fixed to the cable guiding portion.

7. A rack according to claim 1, in which the cable retaining portion is adjustably mounted on the cable guiding portion.

8. A rack according to claim 7, in which the cable retaining portion is rotatably mounted on the cable guiding portion.

9. A rack according to claim 7, in which the cable retaining portion is arranged to be mounted on the cable guiding portion by fitting it over a free end of the cable guiding portion.

10. A rack according to claim 7, in which the cable retaining portion is adjustable between a plurality of predetermined different positions relative to the cable guiding portion.

11. A rack according to claim 1, further including one or more cable dividers projecting radially from the guiding portion of a guide.

12. A rack according to claim 11, in which the one or more cable dividers are in the form of discs.

13. A rack suitable for housing connections of cables in a telecommunications or data communications network, the rack including a plurality of cable guides and a plurality of cable guide mountings at each of which the cable guides are capable of being mounted, wherein the cable guides are arranged to be detachably mountable at the plurality of cable guide mountings, are able to be detached and attached without the use of tools and each includes a mounting portion for engagement with a respective cable guide mounting, a guiding portion providing one or more guide surfaces for a cable, a cable retaining portion at the opposite end of the guiding portion to the mounting portion, and one or more cable dividers projecting radially from the guiding portion, the one or more cable dividers being in the form of circular discs and extending around the whole of the cable guiding portion at a substantially constant width.

14. A rack according to claim 11, in which the one or more cable dividers are a friction fit on the cable guiding portion of the guide.

15. A rack according to claim 11, in which at least some of the cable guide mountings are arranged in one or more rows.

16. A rack according to claim 15, in which at least some of the cable guide mountings are arranged in one or more vertical rows and/or one or more horizontal rows.

17. A rack according to claim 11, further including cables which are connected to terminals on the rack, the paths of one or more of the cables being guided by one or more of the plurality of cable guides mountings.

18. A rack suitable for housing connections of cables in a telecommunications or data communications network, the rack including a plurality of cable guides and a plurality of cable guide mountings at each of which the cable guides are capable of being mounted, wherein the cable guides are arranged to be detachably mountable at the plurality of cable guide mountings and are able to be detached and attached without the use of tools, in which each cable guide includes a mounting portion for engagement with a respective cable guide mounting and a guiding portion providing one or more guide surfaces for a cable, in which each guide includes a cable retaining portion at the opposite end of the guiding portion to the mounting portion, further including one or more cable dividers projecting radially from the guiding portion of a guide, further including cables which are connected to terminals on the rack, the paths of one or more of the cables being guided by one or more of the plurality of cable guides being guided by one or more of the plurality of cable guides which are mounted on at least some of the cable guide mountings, in which parts of the cable guides are apertured to facilitate the connection of cable ties between adjacent parts of the same cable guide or parts of adjacent cable guides, and in which cable ties are so connected.

19. A rack according to claim 1, wherein the rack is assembled from a flat pack on site.

20. A method of making cable connections on a rack as claimed in claim 1, including the step of guiding a cable around one or more of the plurality of cable guides.

21. A method as claimed in claim 20, further comprising placing the cable around a cable guide and thereafter adjusting the cable guide to cause a part of the cable retaining portion to overlie part of the cable;

wherein each cable guide includes a mounting portion for engagement with a respective cable guide mounting and a guiding portion providing one or more guide surfaces for a cable;

each cable guide further includes a cable retaining portion at the opposite end of the guiding portion to the mounting portion; and the cable retaining portion projects laterally outwardly from the guiding portion substantially further in one or more directions than in other directions.

22. A method as claimed in claim 20, further comprising placing the cable around a cable guide and thereafter adjusting the cable guide to cause a part of the cable retaining portion to overlie part of the cable;

wherein the rack is suitable for housing connections of cables in a telecommunications or data communications network, the rack including a plurality of cable guides, each guide including a generally rod-shaped guiding portion extending outwardly from a mounted end to a free end, and a cable retaining portion at the free end of the rod-shaped guiding portion, the cable retaining portion extending laterally beyond the guiding portion in one or more radial directions and being rotatable to adjust the direction of said one or more radial directions.

23. A rack according to claim 15, in which at least some of the cable guide mountings are arranged in one or more vertical rows and one or more horizontal rows.

* * * * *

UNITED STATES PATENT AND TRADEMARK OFFICE
CERTIFICATE OF CORRECTION

PATENT NO. : 6,600,107 B1
DATED : July 29, 2003
INVENTOR(S) : Colin Morgan Wright et al.

It is certified that error appears in the above-identified patent and that said Letters Patent is hereby corrected as shown below:

Column 8,
Lines 49-50, please delete
"being guided by one or more of the plurality of cable guides", so that claim 18 reads as follows:

18. A rack suitable for housing connections of cables in a telecommunications or data communications network, the rack including a plurality of cable guides and a plurality of cable guide mountings at each of which the cable guides are capable of being mounted, wherein the cable guides are arranged to be detachably mountable at the plurality of cable guide mountings and are able to be detached and attached without the use of tools, in which each cable guide includes a mounting portion for engagement with a respective cable guide mounting and a guiding portion providing one or more guide surfaces for a cable, in which each guide includes a cable retaining portion at the opposite end of the guiding portion to the mounting portion, further including one or more cable dividers projecting radially from the guiding portion of a guide, further including cables which are connected to terminals on the rack, the paths of one or more of the cables being guided by one or more of the plurality of cable guides which are mounted on at least some of the cable guide mountings, in which parts of the cable guides are apertured to facilitate the connection of cable ties between adjacent parts of the same cable guide or parts of adjacent cable guides, and in which cable ties are so connected.

Signed and Sealed this

Twenty-seventh Day of April, 2004

JON W. DUDAS
*Acting Director of the United States Patent and Trademark Office*